United States Patent [19]

Bowser

[11] 3,995,593
[45] Dec. 7, 1976

[54] FLOORING SYSTEM

[75] Inventor: John O. Bowser, New Kensington, Pa.

[73] Assignee: Aluminum Company of America, Pittsburgh, Pa.

[22] Filed: June 18, 1975

[21] Appl. No.: 587,833

[52] U.S. Cl. .................................. 119/28; 52/588
[51] Int. Cl.² ......................................... A01K 1/00
[58] Field of Search ........... 119/28, 16, 20; 52/586, 52/588, 577–579

[56] References Cited

UNITED STATES PATENTS

| | | | |
|---|---|---|---|
| 3,230,931 | 1/1966 | Taylor et al. | 119/28 |
| 3,303,626 | 2/1967 | Brigham | 52/588 X |
| 3,420,028 | 1/1969 | Barker | 52/588 |
| 3,680,530 | 8/1972 | Drawsky | 119/28 |
| 3,716,027 | 2/1973 | Vickstrom et al. | 119/28 |
| 3,722,473 | 3/1973 | Vickstrom et al. | 119/28 |
| 3,722,474 | 3/1973 | Vickstrom | 119/28 |
| 3,730,140 | 5/1973 | Bowser et al. | 119/28 |
| 3,742,911 | 7/1973 | Lehe et al. | 119/28 |
| 3,757,743 | 9/1973 | Lehe | 119/28 |
| 3,837,319 | 9/1973 | Lehe | 119/28 |

FOREIGN PATENTS OR APPLICATIONS 958,605   12/1974   Canada ............................... 119/28

*Primary Examiner*—J.N. Eskovitz
*Attorney, Agent, or Firm*—David W. Brownlee; Patrick J. Viccaro

[57] ABSTRACT

A floor structure is provided having a plurality of downwardly open U-shaped channel members arranged in a parallel spaced apart relation by a plurality of spacer members and retainer members secured to the spacer members. Each spacer member has a lineal body transversely underlying the channel members, an integral vertical strut that is positioned between and in contact with two adjacent channel members, and upward projections that engage inside the sidewalls of the channel members to prevent the members from twisting and buckling. Each spacer member also includes an end structure for coupling end-to-end with another spacer member. The retainers are secured by fasteners to the vertical struts of the spacers and transversely overlie the channel members, vertically above and parallel to the spacers, to form a rigid floor structure.

9 Claims, 7 Drawing Figures

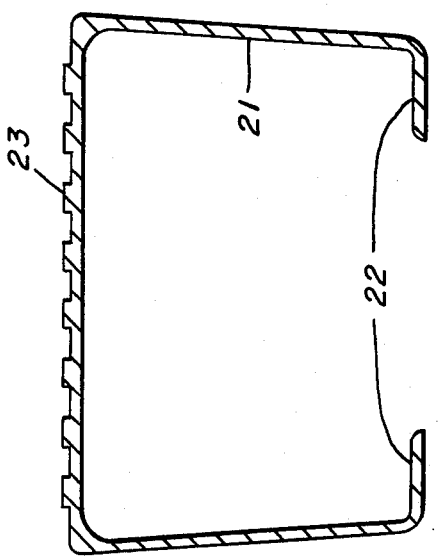
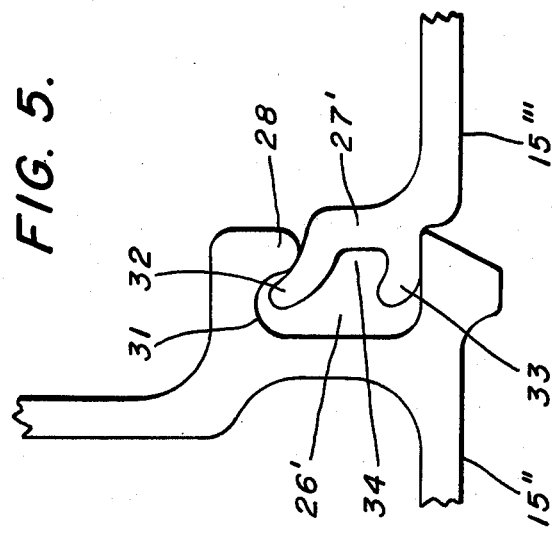
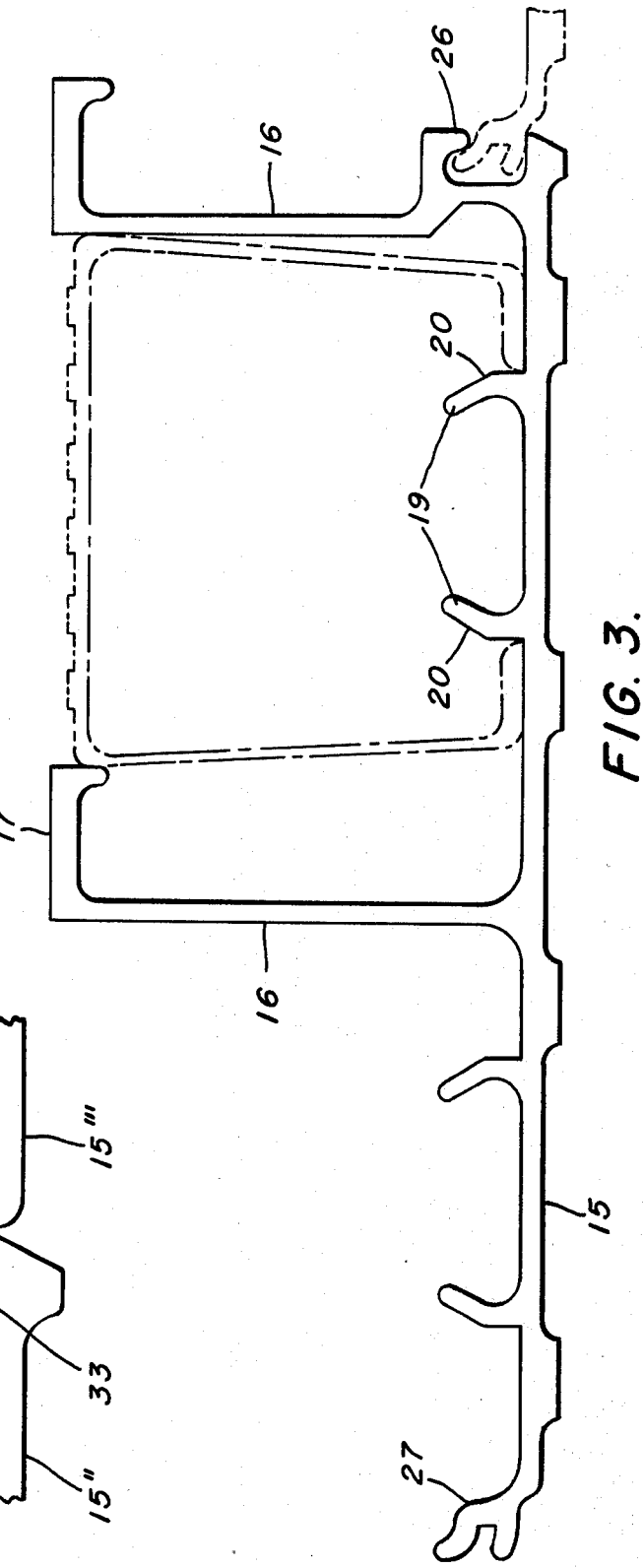

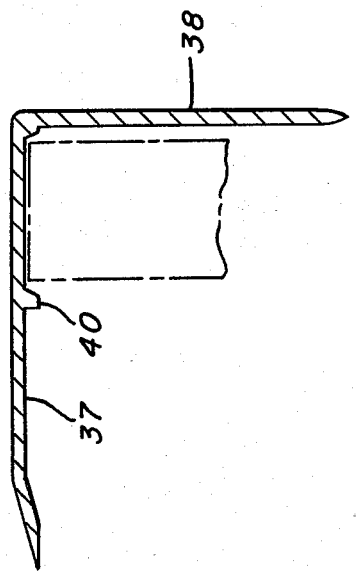
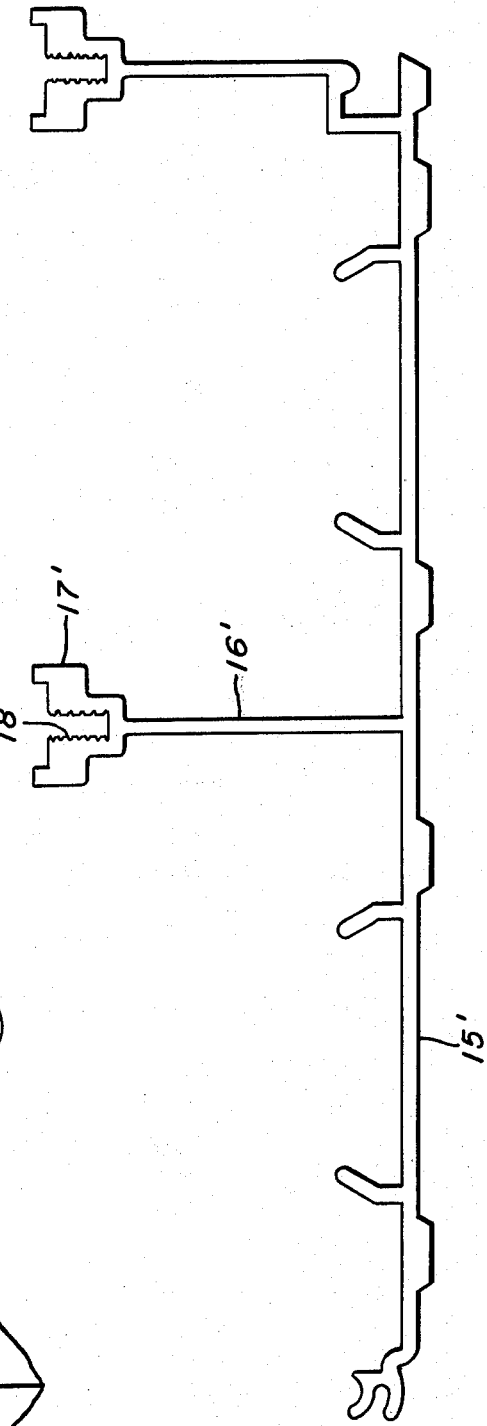
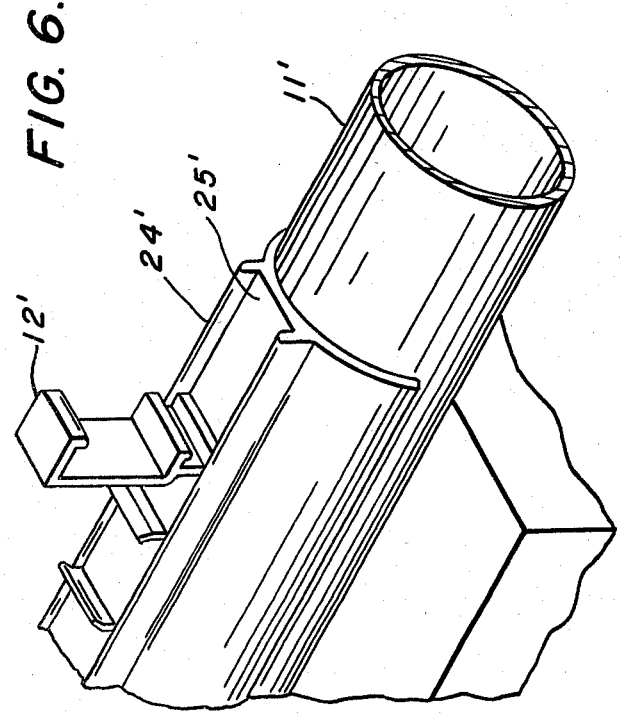

FLOORING SYSTEM

BACKGROUND OF THE INVENTION

In providing a floor structure for livestock enclosures, it is desirable to have a system that can be easily assembled and disassembled and readily cleaned of animal waste. It is known in the art to have parallel spaced apart channel members interconnected by spacer clips engaging the members as is shown in Drawsky U.S. Pat. No. 3,680,530, and to have a connector spacer holding the top of the channel members in a spaced relation as is shown in Vickstrom U.S. Pat. No. 3,722,474. Such floor structures are designed to fit over an open pit and have parallel spaced apart channel members which allow animal waste and debris to drop through the floor and into the pit where it can be collected or removed by a stream of water to an accumulator. While very popular and in wide-spread use, such floor structures are not without problems.

One problem is that the heavy weight of the livestock can twist and buckle the floor slats or channel members and accidentally disengage a member. Such a result can weaken the whole floor or cause an animal's leg to be caught between the channel members. Another problem is that most prior art floor structures require part of their assembly from below the floor, which is awkward and undesirable. Still another problem is that the animal waste and debris can pack between the channels, in the channel ends and on other elements in some floor systems. It is thus desirable to provide a rigid floor structure that is not vulnerable to accidental disassembly, can be easily assembled over the pits without special tools and without any need for having to get under the floor during assembly, and will be less subject to animal waste packing in elements of the floor structure.

SUMMARY OF THE INVENTION

A floor structure is provided which comprises a plurality of downwardly open substantially U-shaped channel members secured in a parallel spaced apart relation by a plurality of spacer members each of which includes a lineal body transversely underlying the channel members and on which the channel members rest. At least one integral vertical strut is included on each spacer means and is positioned between and in contact with two adjacent channel members to maintain the spacing therebetween. A plurality of retainers are attached to the vertical spacer struts transversely across the top of the channel members vertically above and parallel to the spacer means.

An object of the invention is to provide a rigid floor assembly where no part of the assembly procedure requires work from the underside of the channel members.

Another object of the invention is to provide an entire floor system that can be assembled directly over the pit and need not be pre-assembled in panels and carried to the pit.

A further object of the invention is to provide a floor structure that cannot be accidentally disassembled.

Another object of the invention is to provide a floor structure that resists animal waste and debris from packing between the channel members and other elements of the floor structure.

A further object of the invention is to provide a floor assembly that eliminates twisting and buckling of the channel members under the heavy weight of livestock.

Other objects, advantages, details and uses of the invention will become apparent to those skilled in the art after reference is made to the accompanying drawings and descriptions of the exemplary embodiments.

BRIEF DESCRIPTION OF THE DRAWINGS

FIG. 2 is a cross-sectional view of a channel member for the floor assembly illustrated in FIG. 1.

FIG. 3 is a side profile view of a preferred embodiment of a spacer member for the floor assembly illustrated in FIG. 1.

FIG. 4 is a side profile view of an alternative embodiment of a spacer member.

FIG. 5 is a partial side profile view of two spacer members showing interlocking end structures.

FIG. 6 is a perspective view of an alternative embodiment of an alignment strip of this invention on a tubular support member.

FIG. 7 is a cross-sectional view of an end retainer.

Figure 1:
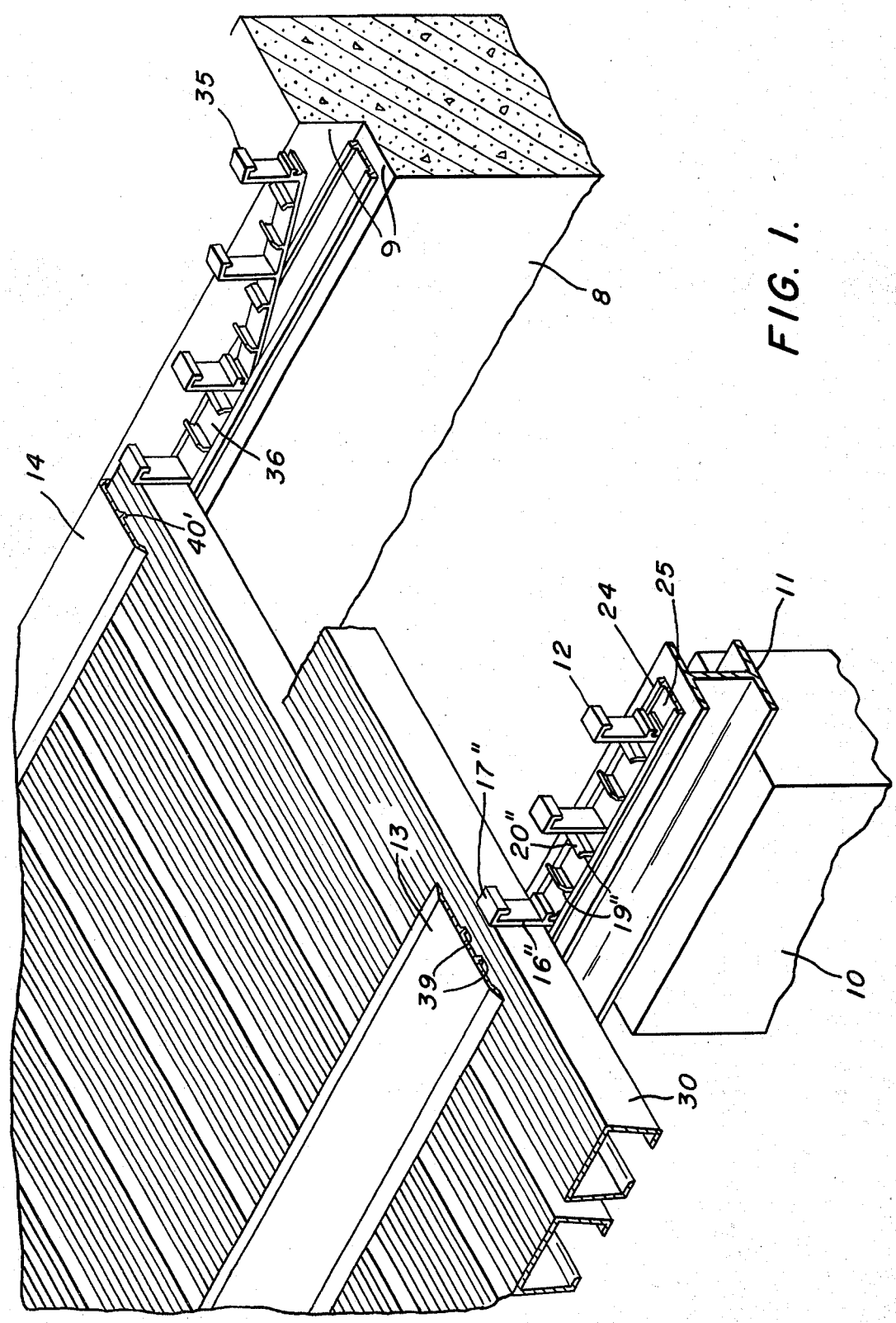
FIG. 1 is a partial perspective view of a preferred embodiment of this invention showing channel members, spacer members, retainers, and alignment strips in partial assembly.

The drawings attached hereto are merely illustrative of the present invention and are not intended to limit the invention to the described embodiments.

DETAILED DESCRIPTION OF A PREFERRED EMBODIMENT OF THE INVENTION

FIG. 1 illustrates a partial perspective view of a preferred embodiment of a floor structure of the present invention as it would appear in a partially assembled condition in an animal enclosure over a pit for receiving animal waste and debris. The flooring is constructed with parallel spaces between the substantially U-shaped channel members or slats 30 to allow animal waste and debris to fall through the spaces into a pit below. A conventional pit may be provided, including those that collect waste and debris for later removal, or one that provides a stream of water to remove the waste. For the purpose of reducing the liklihood of an animal slipping on the floor, an anti-skid pattern may be employed on the top surface of channel members 30, as is well known in the art.

FIG. 1 illustrates, in part, a conventional pit with vertical sidewalls 8 having a step 9 therein supporting a floor assembly of this invention at the end of channel member 30 in such floor and a support pier 10 with an overlying support beam 11 giving added support to the floor assembly at locations intermediate the ends of the channel members 30. The pit walls 8 and support pier 10 may be constructed of concrete, wood, or any other material commonly used in the field.

According to this invention, the channel members 30 are maintained in a parallel spaced apart relation by spacer members 12. In the preferred embodiment, the spacer members 12 are placed on the top surface and along the longitudinal axes of the support beam 11 and step 9 of the vertical wall 8 of the pit. The channel members 30 rest on and are secured to the spacer member 12 transverse thereto. A center or intermediate retainer 13 and an end retainer 14 are placed overlying the channel members 30 parallel to and vertically above the spacer members 12. The retainers 13 and 14 are fastened to the spacer members 12 for the purpose of forming a rigid floor assembly.

FIG. 2 shows the preferred embodiment of a channel member including substantially converging sidewalls 21 with inwardly projecting flanges 22 at the lower edge of each sidewall 21. Preferably, the channel member is extruded from aluminum or one of its alloys. In an installed floor assembly, as illustrated in FIG. 1, the downwardly converging sidewalls allow animal waste and debris to fall through the spaces and not pack between channel members since the spaces are wider at the lower edge of sidewall 21 than at the upper edge. The top surface 23 of a channel member is provided with an anti-skid pattern to reduce the likelihood of animal or man slipping on the floor.

FIG. 3 illustrates a side profile view of a spacer member 12 in the preferred embodiment which includes a body portion 15 with at least one, and preferably two integral vertical struts 16 thereon and a head 17 on each strut. The head 17 is adapted to have holes drilled or punched therein for receiving and securing threaded fasteners which are used to attach the retainers to the vertical struts 16 on the spacer members. The spacer members are made of metal, preferably aluminum or any alloy thereof and are adapted to be extruded from such metal.

FIG. 3 further ilustrates two pairs of upward projections 19 integral with the body portion 15 of the spacer member. The pairs of projections 19, which are located between the vertical struts 16 of the spacer members, in the assembled floor help prevent channel members from twisting and buckling, and from disengaging and causing an animal to catch its leg between the slats.

Further, FIG. 3 illustrates a cross section of a spacer member with end structures 26 and 27 for coupling the members end-to-end, where preferably, structure 26 is an integral part of vertical strut 16 on a spacer member, but can also be located as an integral part of the body portion 15 of a spacer member and not be a part of a vertical strut.

FIG. 4 illustrates in an alternate embodiment a side profile view of a spacer member 12 which includes a body portion 15' with at least one, and preferably two integral vertical struts 16' thereon and a head 17' on each strut. The head 17' of each strut 16' has a slot 18 therein transverse to the longitudinal axis of the body portion 15' of the spacer member. The slot 18 has teeth-like ridges extending on opposite interior faces thereof for receiving and securing threaded fasteners which are used to attach the retainers to the vertical struts 16' on the spacer members.

Although the embodiments of the spacer member selected for purposes of illustration each have two integral vertical struts for convenient extrusion of the member, it should be appreciated that more vertical struts may be provided on such a spacer member. A shape may be extruded which has a cross-section corresponding to the side profile of a spacer member. The shape is cut transversely in the cross-sectional plane into spacer members having a maximum length no wider than the width of the extrusion. The width of the extrusion and, therefore, the length of the spacer members is usually limited to the width of the extrusion dies, since it is not practical to use very wide extrusion dies. Shorter spacer members may have the advantage of easing the assembly of the floor system. It is obvious, however, that other methods can be employed to fabricate spacer members and that the spacer members may vary in width to accomodate structural soundness of the assembled floor system.

As further illustrated in FIG. 5, a partial side profile view of opposite ends of two spacer members interconnected in accordance with the preferred embodiment of this invention, each spacer member has a horizontal slot 26' with a locking rib 28 thereon on one end of the body portion 15" and a locking projection 27' adapted to engage with the slot and rib on the adjacent member at the other end of the body portion 15''' of a spacer member. The locking projection 27' includes an upward curving end 32 to engage and lock against the downwardly extending rib 28 and prevents the spacer means from disengaging after being interconnected and placed on a support beam for installation. Downwardly extending rib 28 is preferably located on the outer edge of the underside of the top wall 31 of slot 26'.

While the preferred embodiment shows an upward curving end 32 and a similar upwardly curving end 33 of locking projection 27' with notch 34 therebetween, it is within the scope of this invention to have only one upward curving end which combines upward curving ends 32 and 33 by eliminating notch 34.

As shown in FIG. 1, in the preferred embodiment, the spacer members 12 are placed in an upward facing longitudinal groove 25 of an alignment strip 24. The alignment strip 24 may be made of metal, such as aluminum or an alloy thereof, or can be a plastic extrusion, and has an upward facing longitudinal groove 25 therein and a downwardly facing flat surface which is placed in contact with support beam 11 or step 9. A function of the alignment strips is to maintain the interconnected spacer members 12 from shifting across the width of support beam 11 and possibly falling off the edge of the support beam. Another purpose is to keep the spacer members 12 interconnected in a straight line by confining the spacer members 12 within the groove 25 and thus limiting the shifting of the connected spacer members in relation to each other transverse to the longitudinal axis of the alignment strip 24. By limiting the transverse movement of the spacer members, they cannot be accidentally uncoupled at their end structures 26 and 27. In addition, the alignment strip 24 maintains the spacer members 12 in a straight line to simplify the assembly of the floor system. Alignment strip 24 is placed in contact with support beam 11 or step 9 and, if desired, may be secured thereto by conventional methods.

FIG. 6 illustrates an alternative embodiment of an alignment strip 24' as a lineal metal or plastic extrusion adapted to be placed on pipe supports 11' or other arcuate support means. Similar to the embodiment described in the preceding paragraph, spacer members 12' lie in an upwardly extending groove 25'.

It should be appreciated that the alignment strip 24 is preferably insulated to prevent galvanic action from developing between the aluminum floor system and the supporting devices due to a dissimilarity of materials. A rigid plastic extruded alignment strip acts as insulation between the supporting walls and beams and the metal floor system. When an extruded aluminum alignment strip is used, the contacting surfaces between the alignment strip and the dissimilar material of support devices are preferably insulated. One way to insulate is to paint the contacting surfaces with a conventional heavy-bodied bituminous paint.

FIG. 1 is further illustrative of center or intermediate retainers 13 and end retainers 14. Intermediate retainer 13 is a substantially flat elongate body, preferably extruded from aluminum or an alloy thereof. Such retainer is fixed transversely across the top of channel members 30 vertically above and parallel to spacer members 12 and support beam 11. The intermediate retainer 13 is preferably wider than the underlying spacers 12 and beam 11 to prevent animal waste and debris from packing between channel members 30 at the location of spacers 12, alignment strip 24, and beam 11. Retainer 13 preferably includes two projections 39 extending parallel to the longitudinal axis of the retainer and protruding downwardly from the bottom surface of retainer 13 that interfaces with the channel members 30, and at a distance between projections 39 that is slightly greater than the width of the head of the vertical strut of the spacer member in a loose fitting abutment with the head.

End retainer 14 is an elongate body, preferably extruded from aluminum or an alloy thereof, having a substantially L-shaped cross-section with two lineal leg portions 37 and 38, as is illustrated in FIG. 7. The first lineal leg portion 37 is adapted to fit transversely across the top of the end of the channel members similar to the manner of an intermediate retainer described above. The second lineal leg portion 38 is adapted to jut downwardly adjacent the cross-sectional ends of the channel members to prevent animal waste and debris from packing into the ends of channel members. End retainer 14 also preferably includes a projection 40 extending parallel to the longitudinal axis of the retainer and protruding downwardly from first lineal leg portion 37, at a distance between projection 40 and second lineal leg portion 38 that is slightly greater than the width of the head of the vertical strut of the spacer member to form a loose fit with the head. Use of the end retainers 14, as is illustrated in FIG. 1, helps to accommodate minor variations in the length of the channel members 30 which comprise the floor. The end retainers 14 are positioned with downwardly jutting leg portion 38 in abutment against the vertical wall portion of step 9 and the first leg portion 37 overlying the end of the channels 30 to hide any minor differences in length.

In the preferred embodiment, retainers 13 and 14 of FIG. 1 are not provided with pre-punched holes to be used for receiving fasteners for securing the retainers to spacer members 12 to provide a rigid floor assembly. The holes are punched or drilled into the retainers 13 and 14 after the retainers have been placed transversely across the top surface of the channel members. It should be appreciated that the spacing of the holes can be such that the fasteners, preferably threaded, are secured to the spacers between every channel member or between enough channel members to render the entire floor system rigid. Preferably, retainer bolts secure the retainers to the spacers between every third channel member. In the alternative embodiment, retainers 13 and 14 are provided with pre-punched holes at predetermined spacing to be used for receiving fasteners, preferably threaded, for securing the retainers to spacer members 12.

As shown in FIG. 1, a floor, a preferred embodiment of this invention can be assembled by first placing the alignment strips 24 on the support beams 11 and on steps 9 of the vertical walls 8 of the pit. A plurality of spacer members 12 are coupled end-to-end in the upward facing longitudinally extending groove 25 of alignment strips 24 to form a continuous length of spacer members for supporting and maintaining a parallel spaced apart relation of channel members.

FIG. 1 illustrates a manner in which the spacer members are interconnected end-to-end with the end structure in each spacer member engaged with the cooperating end structure of the adjacent spacer member. After a first spacer member 36 is positioned in the groove of an alignment strip, a second spacer, as shown by spacer 35, is held inclined to the horizontal plane with one end, containing the locking projections, positioned lower than the end with the locking horizontal slot. The locking projections of spacer 35 are placed inside the slot of the spacer 36, and then the higher positioned end of spacer 35 is lower by rotating it about the mating end structures of spacer 36 and spacer 35 until it contacts the groove of the alignment strip. The spacers are then interconnected at their end structures as shown in FIG. 5 as a result of locking projection 32 rotating about rib 28 of the locking horizontal slot 26'. Each spacer is interconnected to an adjacent spacer in the same manner as descried herein until a desired continuous length of spacer members is formed.

It is obvious from the above paragraph that spacer members of the present invention can be interconnected in a reverse manner. The inclined spacer 35 and first spacer 36 of FIG. 1 can be reversed such that the lower end of spacer 35 contains the locking slot. Spacer 35 can then be positioned so that the locking projections of spacer 36 are placed inside the locking slot of spacer 35. Spacer 35 can then be rotated similarly as described in the preceding paragraph to form an interlocking end structure of FIG. 5.

Channel members 30 of FIG. 1 are next positioned on the assembled spacer members 12 so that head 17" of each vertical strut 16" on each spacer member is engaged against the two adjacent channel members on the opposite sides of the strut to provide the parallel spaced apart relation between the channel members. In the preferred embodiment, head 17" of vertical strut 16" on each spacer member protrudes beyond the top surface of channel members 30 by approximately ⅛ inch for purposes of loose engagement with projections 39 and 40 of retainers 13 and 14. The engagement maintains the retainers in alignment over the spacers to ease punching or drilling holes in the retainers 13 and 14 in the heads 17" of the spacer members. In addition, the engagement aids the structural rigidity of the assembled floor system after being secured by threaded fasteners. Each channel member 30 of FIG. 1, is positioned between two vertical struts with the innermost part of each sidewall of a downwardly open channel member contacting upward projections 19" at surface 20". The upward projections 19" thereby keep the channel member from shifting out of position or twisting along its longitudinal axis when loads are applied to the floor assembly.

Intermediate retainers 13 and end retainers 14 are next placed transversely overlying channel members 30 at locations of support beams 11 and steps 9, respectively, so that the downward projections 39 and 40' are positioned adjacent the spacer head 17" with head 17" between projections 39 of retainer 13 or between projection 40' and the second lineal leg of retainer 14. Holes are punched or drilled into retainers 13 and 14 and the underlying head 17" of spacer member 12. Retainers 13 and 14 are attached to the head portions of vertical struts of spacer members 12 by threaded fasteners through punched spaced holes in the top of the retainers.

In accordance with this invention, a floor is provided which can easily be assembled by attaching retainers to the spacer members to channel members and which provides a rigid assembly that cannot be accidentally disengaged. The channel members, retainers, and spacers provide a rigid assembly such that the lightweight floor can be lifted and removed easily to get into the pit below. If it ever becomes necessary to remove a channel member, it can be easily removed by simply unfastening the retainers.

It is therefore seen that this invention provides a lightweight flooring system which can easily be assembled over a pit with no special tools and has the characteristic of being easily cleaned and maintained.

Although a preferred embodiment of a floor assembly of this invention has been illustrated and described, it will be apparent to those skilled in the art that many changes can be made therein without departing from the scope of the invention.

What is claimed is:

1. A floor structure comprising:
    a plurality of downwardly open substantially U-shaped channel members in a parallel spaced apart relation;
    spacer means for maintaining the spacing between said channel members arranged transversely of the channel members at two or more locations with each spacer means including
        a lineal body portion underlying and transverse to said channel members,
        a vertical strut disposed between each pair of adjacent channel members and in contact therewith,
        an end structure for coupling the lineal body portion of the spacer means end-to-end with the lineal body portion of an adjacent spacer means comprising a horizontal slot in one end of the lineal body with a downwardly extending rib on the upper surface of said slot, and a locking projection on the other end of said lineal body portion with an upward curving end on such projection to engage and lock against the downwardly extending rib in said slot in the end of the adjacent spacer means, and
        upward projections from the lineal body portion thereof between the vertical struts contacting the inside sidewalls of the said channel member thereover to prevent buckling and twisting of the channel member;
    retainers fixed transversely across the top of said channel members, vertically above and parallel to each of said spacer means and attached to the spacer means; and
    fasteners interconnecting said spacer means and said retainers.

2. A floor structure as set forth in claim 1 in which each of said spacer means includes a slot on the top surface of each of the vertical struts thereon and each slot has teeth-like ridges on opposite interior walls thereof with the slot in each vertical strut adapted to receive a threaded fastener to secure a retainer to the struts.

3. A floor structure as set forth in claim 1 in which each said channel member has substantially vertical sidewalls and a flange at the lower edge of each sidewall projecting inwardly toward the flange on the other sidewall of the channel member.

4. A floor structure as set forth in claim 1 in which each said channel member has downwardly converging sidewalls, with the space between the channel members being wider at the lower edge of the sidewalls than at the upper part of the sidewall.

5. A floor structure as set forth in claim 1 in which each said retainer is wider than the underlying spacer means and is secured to the struts on the underlying spacer means by threaded fasteners to form a rigid floor system and to prevent animal waste and debris from packing between said channel members.

6. A floor structure as set forth in claim 1 including an alignment means comprising an elongate body with an upward facing longitudinally extending groove therein in which the lineal body portion of each spacer means is disposed.

7. A floor structure comprising:
    a plurality of downwardly open substantially U-shaped channel members in a parallel spaced apart relation;
    spacer means for maintaining the spacing between said channel members arranged transversely of the channel members at two or more locations with each spacer means including a lineal body portion underlying and transverse to said channel members and a vertical strut disposed between each pair of adjacent channel members and in contact therewith;
    retainers fixed transversely across the top of said channel members, vertically above and parallel to each of said spacer means and attached to the spacer means;
    wherein one of said retainers is an end retainer securing the channel members at their ends comprising first and second lineal leg portions forming a substantially L-shaped cross section with the first lineal leg disposed transversely across the top of said channel members at their ends and the second lineal leg jutted downwardly from said first leg adjacent the ends of said channel members, with said first leg being wider than one of said underlying spacer means, said end retainer being secured to the vertical struts of said spacer means by a threaded fastener to form a rigid floor system and to prevent animal waste and debris from packing between said channel members; and
    fasteners interconnecting said spacer means and said retainers.

8. In a floor structure having a plurality of downwardly open substantially U-shaped channel members in a parallel spaced apart relation, each member having downwardly converging sidewalls, a spacer means for maintaining the spacing between said channel members disposed between and in contact with each pair of adjacent channel members, and a retainer overlying and securing said channel members together, wherein the improvement comprises:
    spacer means arranged transversely of said channel members at two or more locations with each spacer means including a lineal body portion underlying and transverse to said channel members and a vertical strut disposed between each pair of adjacent channel members and in contact therewith, where each of said spacer means includes an end structure for coupling each lineal body portion of a spacer means end-to-end with the lineal body portion of an adjacent spacer means and upward projections from the lineal body portion thereof between the vertical struts contacting the inside sidewalls of the said channel member thereover to prevent buckling and twisting of the channel member;

a retainer fixed transversely across the top of said channel members, vertically above, parallel to, and wider than each of said spacer means and attached to the spacer means;

an end retainer securing the channel members at their ends comprising first and second lineal leg portions forming a substantially L-shaped cross section with the first lineal leg disposed transversely across the top of said channel members at their ends and the second lineal leg jutted downwardly from said first leg adjacent the ends of said channel members, with said first leg being wider than an underlying spacer means, said end retainer being secured to the vertical struts of said spacer means by a threaded fastener to form a rigid floor system and to prevent animal waste and debris from packing between said channel members; and a plurality of alignment strips comprising an elongate body with an upward facing longitudinally extending groove therein in which the lineal body of said spacer means is disposed.

9. A floor assmbly comprising:

a plurality of downwardly open U-shaped channel members in a parallel spaced apart relation, each member having downwardly converging sidewalls with an inwardly projecting flange on the bottom edge of each sidewall, with the space between adjacent channel members being wider at the lower edge of the sidewalls than at the upper part of the sidewall;

a plurality of spacer means for maintaining a parallel spaced apart relation of said channel members with each spacer means including a lineal body portion underlying and transverse to said channel members, and at least one integral vertical strut disposed between and in contact with two adjacent channel members, and an end structure for coupling the lineal body portion of the spacer means end-to-end with an adjacent spacer means comprising a horizontal slot in one end of the lineal portion with a downwardly extending rib on the upper surface of said slot, and a locking projection on the other end of said lineal body with an upward curving end on such projection to engage and lock against the downwardly extending rib in said slot in the end of the adjacent spacer means;

a plurality of retainers fixed transversely across the top of said channel members, vertically above, wider than, and parallel to said spacer means and attached thereto, and end retainers comprising first and second lineal legs forming an L-shaped cross section, with the first lineal leg disposed transversely across the top of said channel members at their ends and the second lineal leg jutted downwardly from said first leg adjacent the ends of said channel members with said first leg being wider than the underlying spacer means, said end retainers being secured to the vertical struts of said spacer means by a threaded fastener;

threaded fasteners for securing said spacing means to said retainers; and a plurality of alignment strips comprising an elongate body with an upward facing longitudinally extending groove therein in which the lineal body of said spacer means is disposed.

* * * * *